(12) United States Patent
Renke et al.

(10) Patent No.: US 6,513,863 B1
(45) Date of Patent: Feb. 4, 2003

(54) VEHICLE INTERIOR DOOR APPARATUS AND INTERLOCK SYSTEM

(75) Inventors: David Thomas Renke, Macomb, MI (US); Carlos N. Czirmer, Rochester, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/081,505

(22) Filed: Feb. 22, 2002

(51) Int. Cl.$^7$ .................................................. B60J 7/00
(52) U.S. Cl. ................................. 296/190.11; 296/57.1
(58) Field of Search ............................ 296/190.11, 165, 296/37.6, 57.1, 183, 24.1, 26.11, 37.16; 49/360, 380; 224/404

(56) References Cited

U.S. PATENT DOCUMENTS

| | | | | |
|---|---|---|---|---|
| 2,816,794 A | * | 12/1957 | Temp ..................... | 296/190.08 |
| 3,169,792 A | * | 2/1965 | Viquez ..................... | 296/26.11 |
| 3,770,312 A | * | 11/1973 | Shadburn ................. | 296/190.1 |
| 4,076,301 A | * | 2/1978 | Gergoe ....................... | 296/57.1 |
| 4,119,341 A | * | 10/1978 | Cook ..................... | 296/146.16 |
| 4,480,868 A | * | 11/1984 | Koto ..................... | 296/190.11 |
| 4,613,183 A | * | 9/1986 | Kesling .................. | 296/190.08 |
| 4,626,020 A | * | 12/1986 | Kaltz et al. ............. | 296/107.07 |
| 4,671,013 A | * | 6/1987 | Friese et al. ............. | 296/146.2 |
| 4,793,099 A | * | 12/1988 | Friese et al. ................... | 49/380 |
| 4,848,832 A | * | 7/1989 | Starnes .................. | 296/190.11 |
| 4,941,702 A | * | 7/1990 | Southward ............. | 296/190.11 |
| 5,000,496 A | * | 3/1991 | Miskech et al. ............. | 292/225 |
| 5,536,057 A | * | 7/1996 | Stewart .................... | 296/37.16 |
| 5,934,727 A | * | 8/1999 | Storc et al. ............... | 296/26.11 |
| 5,967,584 A | * | 10/1999 | McCarthy et al. ........ | 296/37.16 |
| 6,224,138 B1 | * | 5/2001 | Adsit et al. ................. | 296/37.6 |
| 6,234,560 B1 | * | 5/2001 | Hunt ..................... | 296/100.03 |
| 6,260,916 B1 | * | 7/2001 | Hunt ..................... | 296/190.11 |
| 6,276,751 B1 | * | 8/2001 | Ikarashi et al. ......... | 296/190.11 |
| 6,416,104 B1 | * | 7/2002 | Fisher et al. ........... | 296/190.11 |
| 6,435,596 B1 | * | 8/2002 | Pyo ............................ | 296/57.1 |
| 2001/0030448 A1 | * | 10/2001 | Wilson .................. | 296/190.11 |
| 2002/0070582 A1 | * | 6/2002 | Pyo ........................ | 296/190.11 |
| 2002/0089211 A1 | * | 7/2002 | Duffy .................... | 296/190.11 |

FOREIGN PATENT DOCUMENTS

JP          58-30877    *  2/1983

* cited by examiner

*Primary Examiner*—Kiran Patel
(74) *Attorney, Agent, or Firm*—Laura C. Hargitt

(57) ABSTRACT

A midgate in a truck or other vehicle has a power actuated window in a hinged midgate panel that has an optional pass through closure with inner and outer closure panels openable for transferring articles between compartments separated by the midgate without requiring opening or folding down of the midgate panel itself. An interlock system protects the window by requiring that the window be retracted into the midgate panel before the midgate latches can be released for folding down the midgate panel. It also prevents the window from being actuated unless the midgate panel is latched closed. The interlock system prevents the optional pass through closure from being opened unless the window is fully closed and also prevents the window from being lowered if either pass through door closure is open. The midgate may be applied to various types of multi-use vehicles; for example, open or closed body trucks, vans, station wagons, etc.

13 Claims, 5 Drawing Sheets

VEHICLE INTERIOR DOOR APPARATUS AND INTERLOCK SYSTEM

TECHNICAL FIELD

This invention relates to vehicles, such as pickup trucks, in which a rear wall of the vehicle passenger compartment is adaptable to provide various configurations for optionally increasing cargo space by extension into the rear passenger area or, alternatively, closing off the cargo area from the passenger compartment.

BACKGROUND OF THE INVENTION

It is known in the art to provide a pickup truck having a cab portion for carrying passengers in a rear seat section behind the driver and a cargo box behind the cab portion for carrying cargo. It is also known to provide aligned openings in the cab portion and the cargo box for carrying longer loads which extend into the passenger compartment with the rear seat folded down. Currently a multi-use vehicle is available which provides a pickup truck having a rear passenger compartment convertible to a cargo area and separated from a rear pickup box by a midgate having a flexible hinged panel and window system. This vehicle is adapted to accommodate a variety of optional configurations for alternatively carrying a maximum passenger load or an extended cargo load under both covered and uncovered conditions where the cargo load is protected from or exposed to ambient external conditions. However, a modified midgate having a power actuated window and other features is desired.

SUMMARY OF THE INVENTION

The present invention provides a modified hinged midgate that has a power actuated window as well as additional features. The midgate may include a pass through opening with a closure that is openable for transferring articles between compartments separated by the midgate without requiring opening or folding down of the midgate itself. The invention features an interlock system operative to protect the window by requiring that the window be retracted before the midgate can be opened by folding down a hinged panel forming the lower portion of the midgate. Further, a mechanical interlock is provided which prevents the pass through closure panels from being opened unless the window is raised to its fully closed position. In addition, electrical interlocks prevent the window from being lowered when either pass through closure panel is in an open position. They also prevent window operation if the midgate is not securely latched.

The midgate of the invention is disclosed as applied, in an exemplary embodiment, to a multi-use convertible passenger and cargo vehicle, such as a pickup truck. However its application is not so limited but may also be extended to other types of vehicle applications where its use may be appropriate, such as for example, in an enclosed truck or van.

These and other features and advantages of the invention will be more fully understood from the following description of a specific embodiment of the invention taken together with the accompanying drawings.

DESCRIPTION OF THE PREFERRED EMBODIMENT

Figure 1:
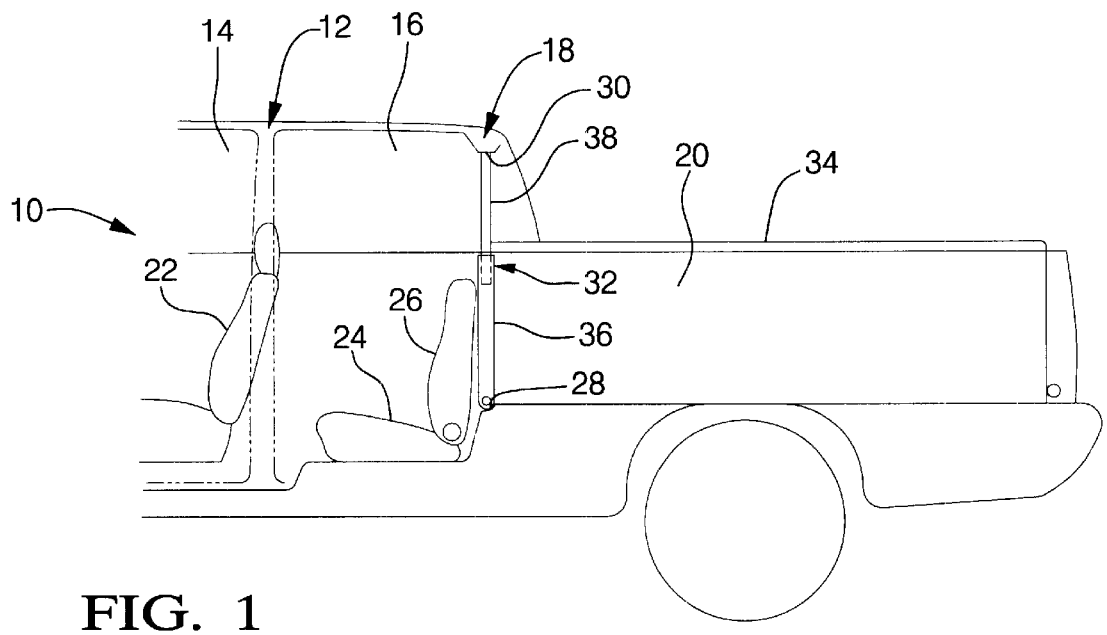
FIG. 1 is a schematic partial side view of a pickup truck body with a switchable rear passenger compartment having a midgate according to the invention shown in the fully closed position.
Figure 2:
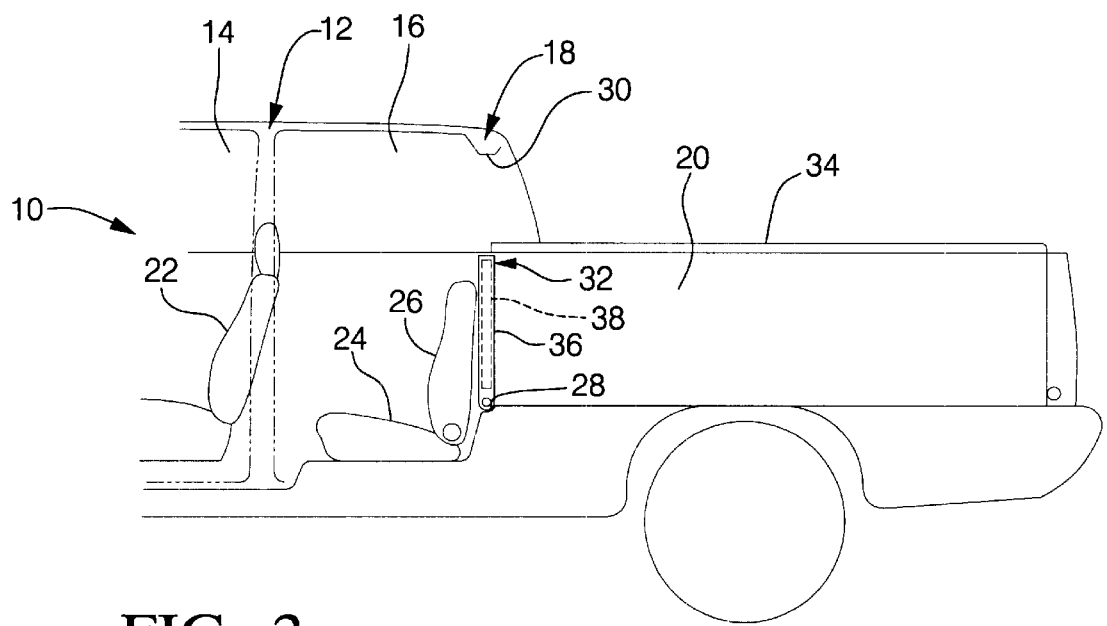
FIG. 2 is a view similar to FIG. 1 but showing the midgate with the window retracted into the hinged panel.
Figure 3:
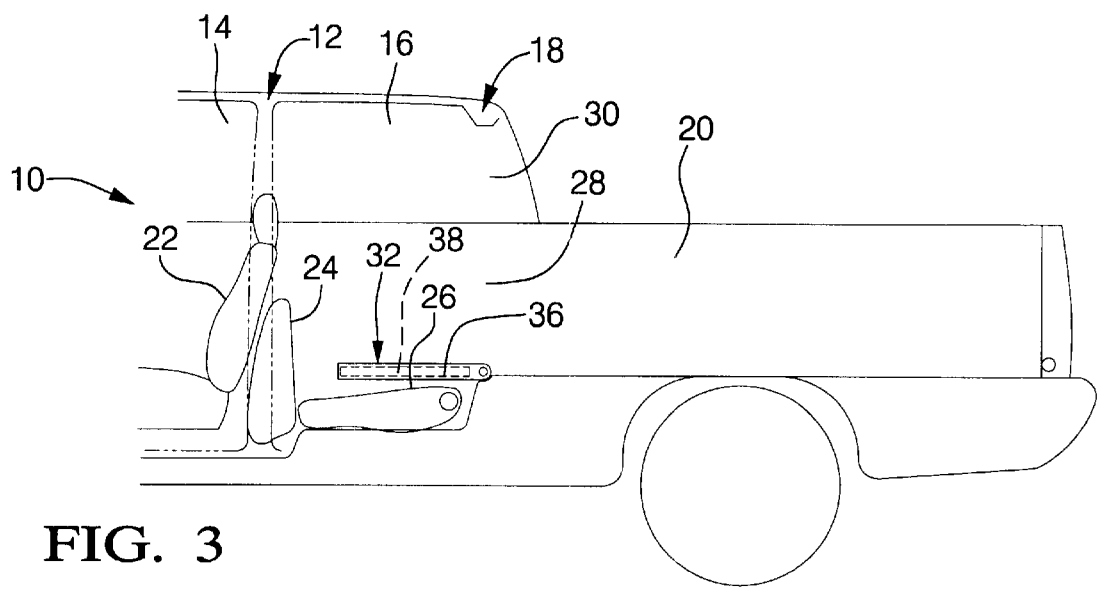
FIG. 3 is a view similar to FIG. 2 but showing the rear passenger seats and the hinged midgate panel folded down to increase the total length of the cargo bed.

Referring first to FIGS. 1–3 of the drawings, numeral 10 generally indicates a pickup truck of the extended cab type having a body 12 including an internal front compartment 14 connected with an internal rear compartment 16 which is separated by an intermediate wall 18 from an external rear cargo compartment or cargo box 20. The rear cargo compartment or cargo box 20 is optionally closed by a removable cover 34. As shown, the front compartment includes at least one passenger seat 22 for carrying the driver and one or more passengers. The rear compartment 16 also includes a seat including a lower cushion 24 and a back cushion 26.

The intermediate wall 18 includes a lower panel opening 28 and an upper window opening 30 both of which may be closed by a midgate 32. The midgate 32 includes a midgate panel 36 and a midgate window 38.

The lower opening 28 communicates the passenger rear compartment 16 with the interior of the cargo compartment 20. Opening 28 is normally closed by the midgate panel 36 which is pivotally mounted on the body adjacent its lower end and is movable between a closed position, as shown in FIGS. 1 and 2, wherein the panel closes the lower opening 28, and an open position, as shown in FIG. 3, wherein the panel pivots forward and opens communication between the cargo compartment 20 and the rear passenger compartment 16.

The upper window opening 30 is normally closed by the midgate window 38, which is supported by a conventional power window drive mechanism, not shown, that is mounted within the midgate panel 36. The various features of the midgate 32, as well as the rear seat cushions 24, 26 and the cargo box cover 34 are movable into various positions, to be subsequently described, in order to reconfigure the truck body 12 for various modes of use.

FIG. 1 shows the truck body 12 in a conventional position for maximum passenger accommodation wherein the rear seat cushions 24, 26 are positioned to carry passengers. The midgate panel 36 is in its closed position, separating the covered cargo compartment 20 from the rear passenger compartment 16 and the midgate window 38 is raised to close the upper opening 30 and protect the passenger rear compartment 16 against the entry of ambient air or water from the exterior of the vehicle. The cargo cover 34 is also in place to enclose the cargo compartment and protect materials which may be carried there from direct exposure to exterior ambient conditions.

Figure 4:
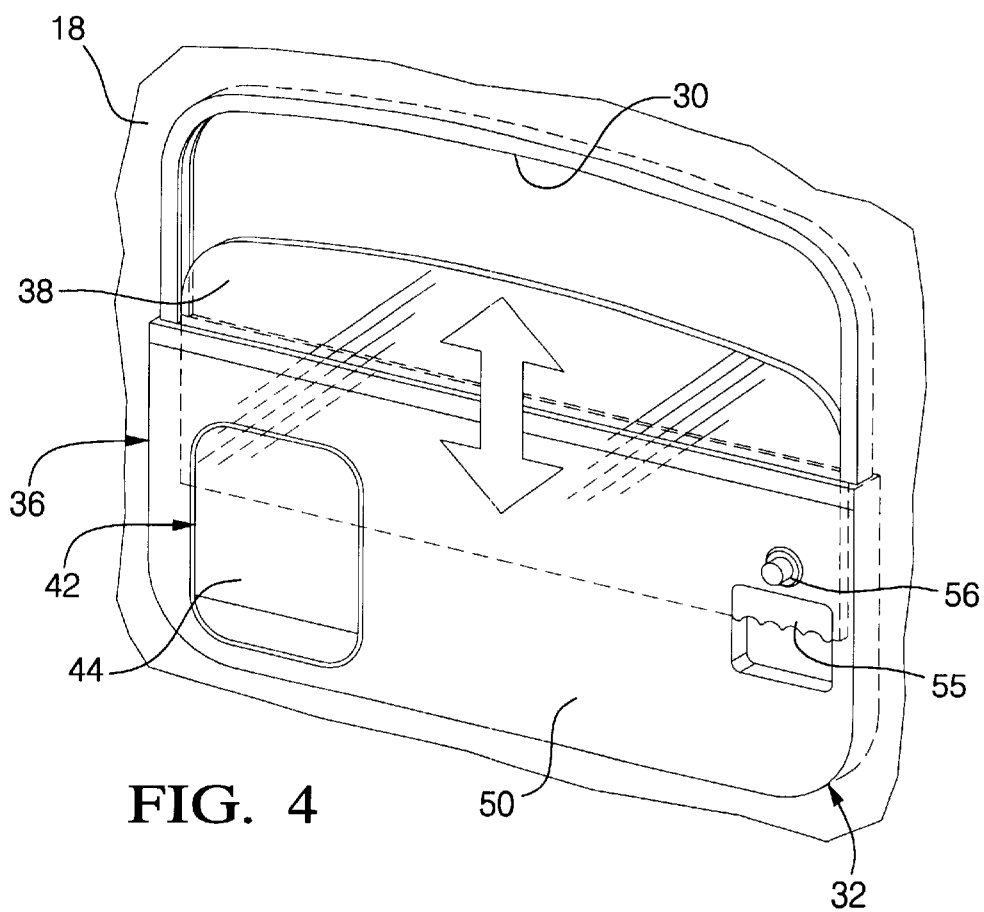
FIG. 4 is a pictorial view of the midgate from the interior of the rear passenger compartment showing the window partially retracted with both the pass through closure and the hinged midgate panel in their closed positions.

As will be subsequently further explained, the power window drive mechanism, not shown, is conventionally operable to control the position of the midgate window 38. When desired, the window 38 is held by the mechanism in the upper closed position shown in FIGS. 1 and 5. Optionally, the window may be lowered fully into the midgate panel 36 as shown in FIG. 2. Alternatively, the window may be partially lowered for ventilation as shown in FIG. 4. When the window 38 is fully lowered, the midgate panel 36 may be tilted forward with the window inside to open communication through the lower opening 28.

FIG. 2 illustrates one of the optional configurations wherein the midgate window 38 is lowered to open communication through the upper opening 30 between the passenger rear compartment 16 and external ambient air. The cargo cover 34 is shown in place, bearing against the midgate panel 36 to maintain protection of cargo in the cargo compartment against exposure to the elements. If desired, the cargo cover 34 may be removed to open the cargo compartment while the window 38 remains open, as shown, or is closed, as shown in FIG. 1.

FIG. 3 illustrates another optional configuration, wherein the rear seat cushions are first reconfigured with the lower cushion 24 pivoted forward and the back cushion 26 pivoted forward and downward to form a floor for storing cargo within the rear passenger compartment. This may be accomplished with the midgate panel 36 upright and the window 38 raised, as shown in FIG. 1, so that the rear passenger compartment becomes a second cargo compartment completely closed in the body.

However, FIG. 3 illustrates an alternative wherein the window 38 is lowered into the midgate panel 36 and the panel is pivoted downward and forward to lie against the upper surface of the back cushion 26, forming a floor for cargo which may extend from the rear cargo compartment 20 into the rear passenger compartment 16. In this alternative, with the cargo cover 34 removed as shown, the passenger rear compartment 16 and the adjoining cargo compartment 20 are open to ambient conditions but are configured to receive a maximum amount of cargo which may extend into the rear passenger compartment, now configured for cargo, as well as into the cargo compartment.

Figure 5:
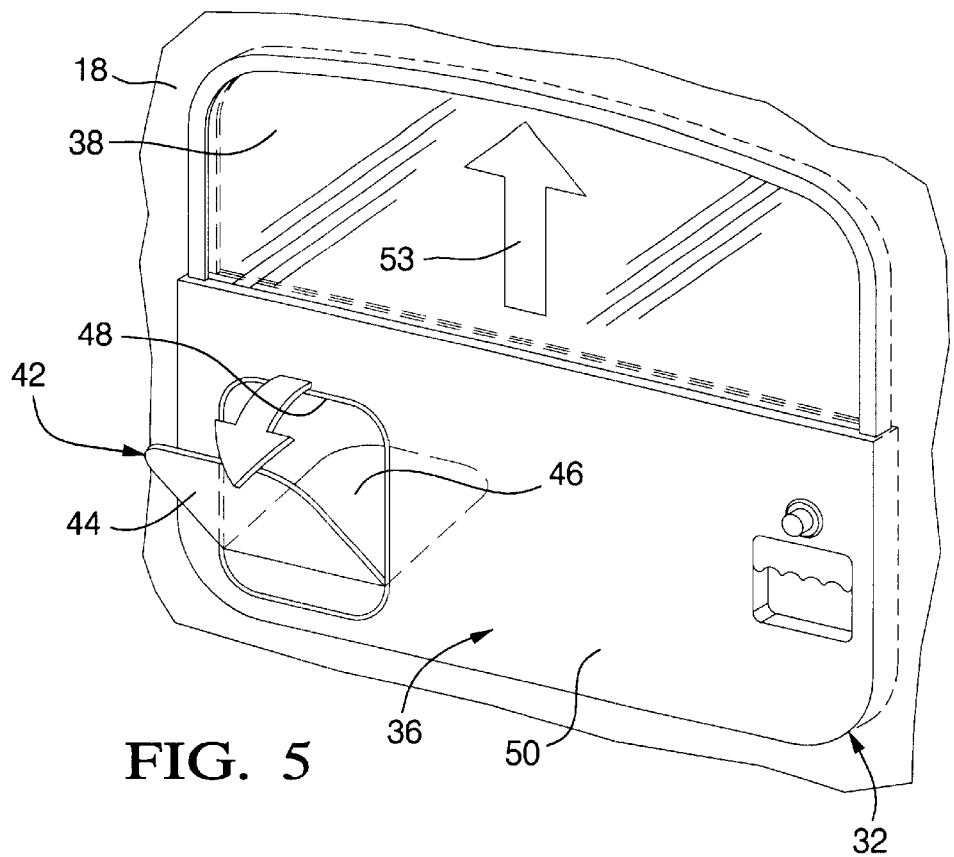
FIG. 5 is a view similar to FIG. 4 showing the window closed and the pass through closure panels partially open.
Figure 6:
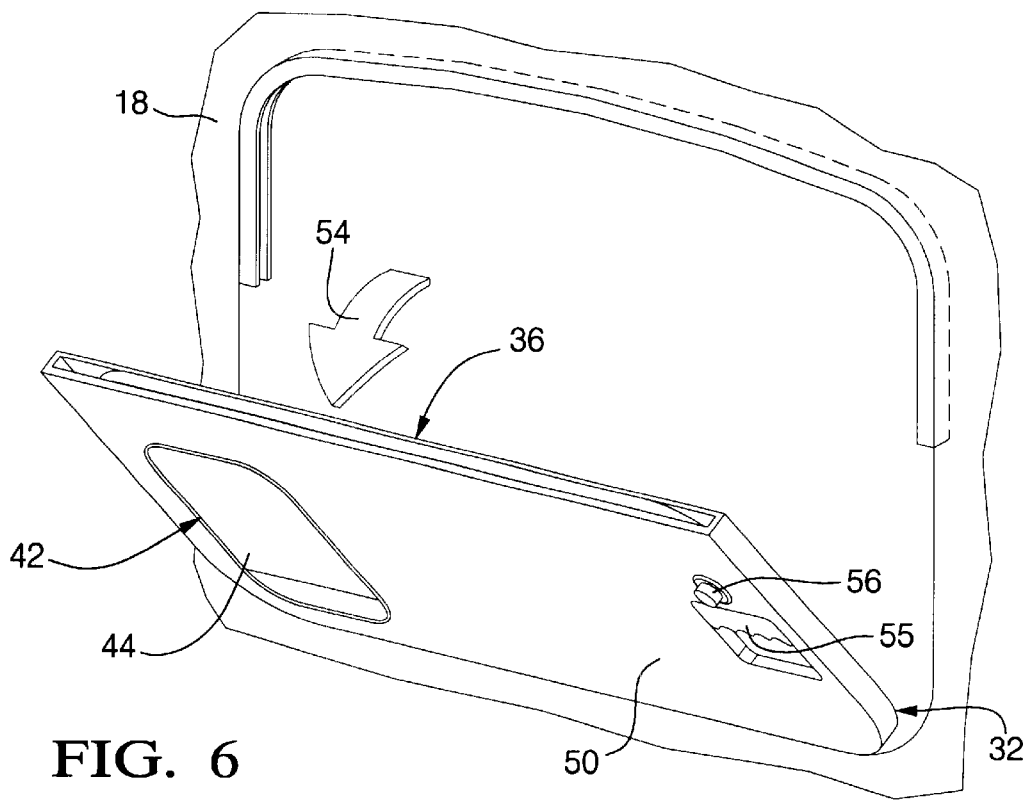
FIG. 6 is a view similar to FIGS. 4 and 5 showing the window fully retracted and the hinged midgate panel partially folded down into the passenger compartment.

FIGS. 4, 5, and 6 illustrate further the operation and certain additional features of the midgate 32 formed in accordance with the invention. In addition to the power operated window 38 previously discussed, midgate 32 includes a pass through closure 42 in the midgate panel 36, shown in FIGS. 4, 5, and 6 from the interior or front side of the midgate 32. The pass through closure 42 includes an inner panel 44 and a separate outer panel 46, both of which are hinged to the bottom of a pass through opening 48 in opposite inner and outer sides 50 and 52 respectively of the midgate panel 36.

Figure 7:
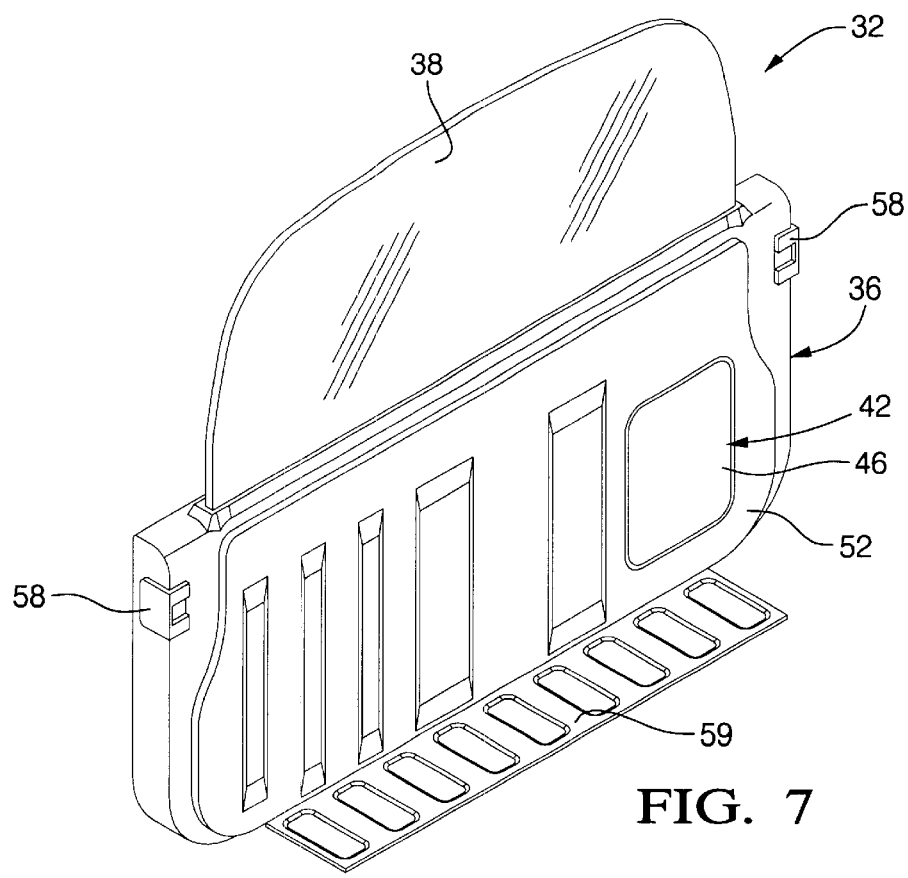
FIG. 7 is a pictorial view of the midgate shown from the rear side facing the cargo bed of the vehicle with the window in the fully raised position.

As shown in FIG. 4, when the pass through inner and outer panels 44, 46 are closed, the midgate window 38 may be lowered to any desired position including all the way into the midgate panel 36, so that it is protected between the inner and outer sides 50, 52 of the panel, the outer side being shown in FIG. 7. Through an interlock system to be subsequently discussed, the midgate window cannot be opened unless both inner and outer pass through panels are closed.

FIG. 5 illustrates opening of the pass through closure panels 44, 46, which are hinged at the bottom and pivot downwardly to permit access through the midgate panel 36 between the interior and exterior compartments of the vehicle, that is, between the rear compartment 16 and the cargo box 20. The interlock system in this case operates to prevent opening of either of the pass through panels unless the midgate window 38 is in the fully closed position as shown by the arrow 53.

FIG. 6 illustrates opening of the midgate panel 36 inwardly in the direction of the arrow 54 toward its full downward position as shown in FIG. 3. In order to unlatch the midgate panel, the interlock system requires that the midgate window 38 be in its full downward position, enclosed within the midgate panel, so that the window is protected from damage during and after lowering of the midgate panel 36 to act as a portion of the load floor of the vehicle. FIGS. 4, 5, and 6 also illustrate the release latch 55 which is utilized to open the panel 36 as shown in FIG. 6. A push button latch release switch 56 above the release latch 55 must be depressed in order to allow the release latch to actuate panel side latches 58, shown in FIG. 7, and allow opening of the midgate panel 36.

FIG. 7 illustrates the midgate 32 as seen from its rear or outer side 52. In this figure, the outer side 52 of the midgate panel 36 as well as the outer panel 46 of the pass through closure 42 are shown. The side latches 58 are shown on either side near the top of the midgate panel 36 and the midgate window 38 is shown extended above the panel. At the lower edge of panel 36 a sliding panel 59 is hinged, which moves with the midgate panel 36 when it is opened downward into the vehicle rear compartment. In this position, the sliding panel 59 covers the gap between the midgate panel 36 and the front edge of the cargo box 20 to provide a continuous floor for carrying cargo in the cargo box and in the forward extension thereof into the rear compartment 16.

Figure 8:
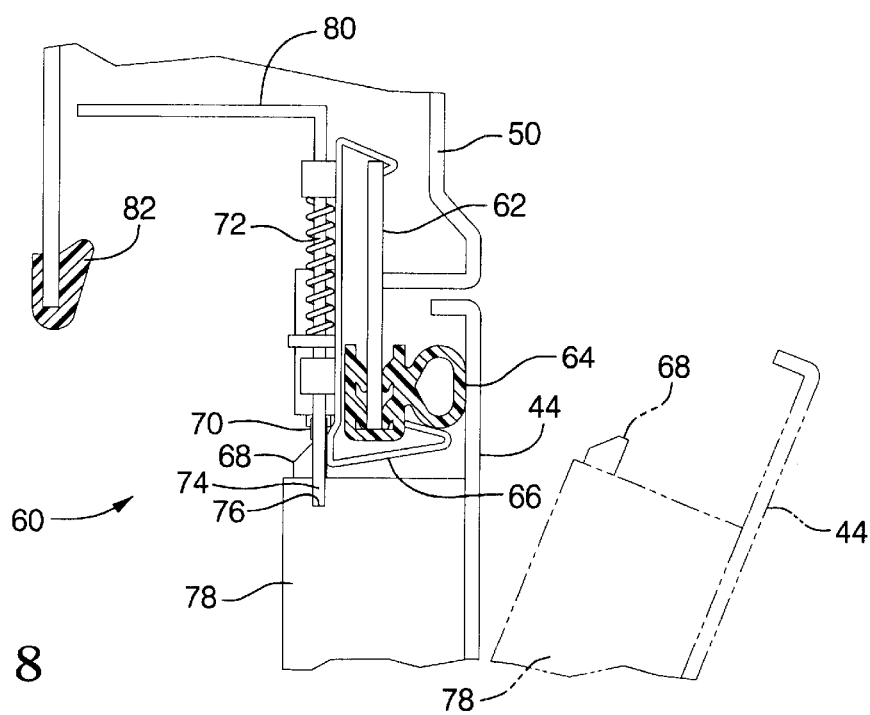
FIG. 8 is a vertical cross-sectional view through the forward, side of the midgate showing portions of the interlock system mechanism for the pass through closure.
Figure 9:
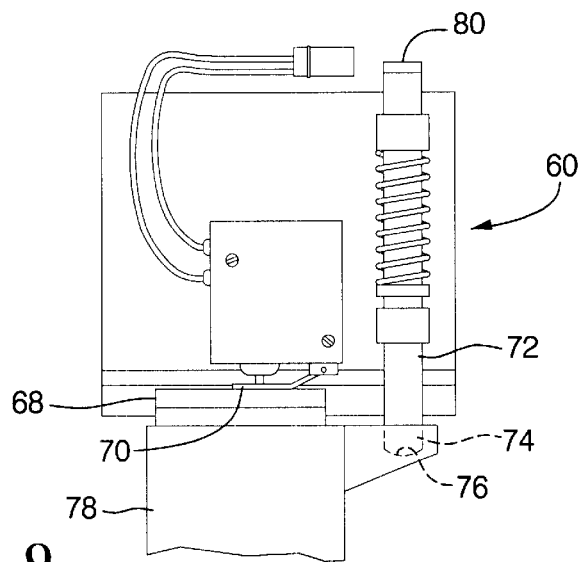
FIG. 9 shows the mechanism of FIG. 8 viewed in the direction of the arrow 9.

FIGS. 8 and 9 illustrate mechanical portions of an electromechanical interlock system 60 provided according to the invention to prevent opening of the pass through closure panels 44, 46 unless the window 38 is in the fully closed position. In FIG. 8, the inner panel 44 of the pass through closure 42 is shown as mounted on the inner side 50 of the midgate panel 36. Inner side 50 includes a mounting flange 62 which carries at its lower edge a weather seal 64 engageable by the inner panel 44 in its closed position. Flange 62 also carries a striker member 66 which is engaged by a latch 68 for holding the panel 44 in its closed position. In this position, the latch 68 also engages a limit switch 70 forming part of the interlock system.

Adjacent to the limit switch 70 on the striker plate 66 is mounted a spring biased plunger 72 having a lower end 74 which, when the window 38 is open, extends into a recess 76 in an extension of the latch body 78. This prevents the pass through inner panel 44 from being opened until the plunger 72 is retracted. As the window 38 is closed, an arm 80, extending inward from the plunger 72, is engaged by a lift clip 82 on the window 38 when the window is raised to its fully closed position. When this occurs, the lift clip 82 raises the arm 80 and the attached plunger 72 so that the inner panel 44 is unlocked and may be released and opened by actuating the latch 68 in a conventional manner. Then, the user can reach through opening 48 in the inner panel 44 to release the latch on the outer panel 46 and open this panel also. Note in FIG. 7 that there is no latch on the outside of the outer panel 46 so that it cannot be opened from the cargo box side of the midgate.

Figure 10:
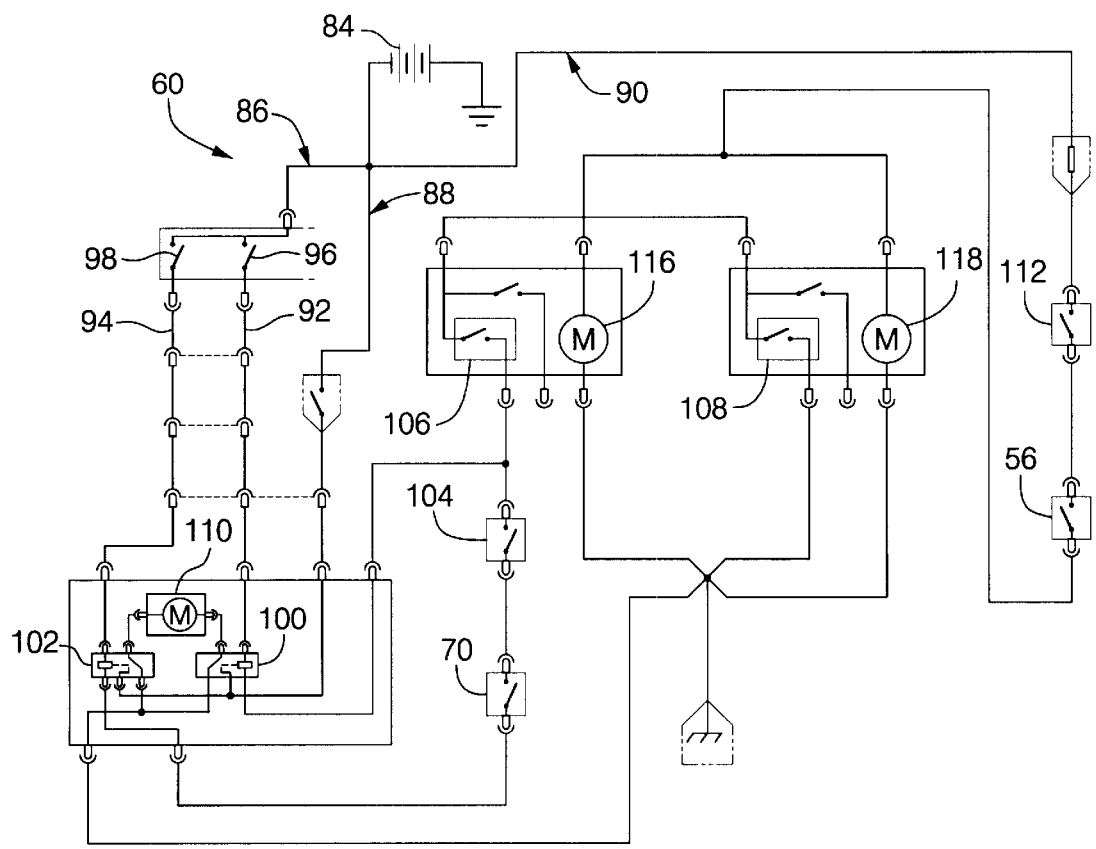
FIG. 10 is a schematic view illustrating electrical portions of the interlock system for use in a preferred embodiment of the invention.

FIG. 10 is a simplified wiring diagram showing the electrical elements of the interlock system 60 for the midgate window and pass through closure mechanisms of the present invention. System 60 includes a battery 84 connected with a window control circuit 86, a window actuating circuit 88 and a midgate latch release circuit 90.

The window control circuit 86 includes window close and window open branches 92, 94 controlled respectively by operator actuated control switches 96, 98. The window close branch 92 also includes a closing relay 100. The window open branch 94 further includes an opening relay 102 as well as, in series, the limit switch 70 for the pass through inner panel 44 and a limit switch 104 for the pass through outer panel 46. Both branches 92, 94 join in including left and right midgate latch ajar switches 106, 108, which are connected in series and to ground.

The window actuating circuit 88 connects the battery 84 with switch portions of relays 100, 102 and through these relays with connections of a window lift motor 110 and then through the relays 102, 100 to ground.

The midgate latch release circuit 90 connects the battery through a window down limit switch 112 and the push button midgate latch release switch 56 with a midgate left latch release motor 116 and a midgate right latch release motor 118, the motors being connected in parallel and then to ground.

Operation of the window control circuit is as follows. Opening of the midgate window requires that the midgate panel latches 58 both be closed so that the midgate is latched in its closed position. Then, closing of the control switch 96 completes the circuit from the battery through the switch 96 and the relay 100, continuing thorough ajar switches 106, 108 to ground. Relay 100 is thereby actuated to connect the battery with the window raising connection of the motor 110 while the other end of the motor remains connected through relay 102 to ground. The motor is thus actuated to lift the window from an open position up to the closed position or therebetween as long as the switch 96 remains closed by the operator.

Actuation of the window down to an open position requires that both pass through closure panels 44, 46 be latched closed and that the midgate latches 58 are also both closed so that the midgate is latched in its fully closed position. When this is the case, actuation of the window open control switch 98 connects the battery through the switch 98 with the opening relay 102 and then, through limit switches 70 and 104 for the pass through panels and ajar switches 106, 108 for the left and right midgate latches, to ground, thus actuating relay 102. The relay feeds battery current to the down side connection of the actuating motor 110 while the other connection is connected through relay 100 to ground, thereby operating the motor to lower the window to its full down position, as desired.

Unlatching of the midgate 32 from its closed position for movement to its fully open position requires that the window 38 be lowered to the full open position and that the manual button latch release switch 56 be actuated by the user while the mechanical latch release 55 is being actuated to release the left and right latches 58. Actuation of the latch release switch 56 then connects the battery through the limit switch 112, indicating that the window is fully open, and through the latch release switch 56 to the latch release motors 116, 118 connected in parallel. Actuation of the motors 116, 118 releases latch retainers, allowing mechanical opening of the latches by the latch release handle 55, the current flow through the motors passing to ground.

The combined electromechanical interlock system 60 thus prevents damage to the midgate window by preventing its movement either up in the closing direction or down in the opening direction if either latch of the midgate is open so that the midgate is slightly or fully ajar. The limit switches 70, 104 on the pass through closure panels 44, 46 also prevent the window from being lowered if either of the pass through closure panels is open.

The mechanical interlock plunger 72 of the inner pass through panel 44 also prevents the pass through closure panels from being opened unless the window 38 is raised to the fully closed position. Thus, if the window is down in any position other than fully closed, the pass through panels cannot be opened even if the electrical system of the vehicle is shut off. This protects the window from being damaged by engaging or being engaged by anything in or entering the pass through opening 48. Use of the mechanical latch on the inner pass through panel 44 is sufficient for this purpose since the latches for both panels are on the inner (or forward) sides of the panels. Thus, the outer panel latch is actuated only by reaching through the opening of the inner panel to open the outer door panel with its inner side latch. Accordingly, when the plunger 72 prevents opening of the inner panel 44 it also prevents opening of the outer panel 46, which cannot be reached unless the inner panel is in the open position and this can only occur when the window 38 is in its fully closed position.

In like manner, the window is protected from damage by attempts to unlatch the midgate 32 unless the window 38 is in the full down position, which is indicated by the limit switch 112 in the latch release circuit 90. Thus, the midgate panel 36 can never be opened unless the window 38 is fully open and stored within the panel 36 and then the panel can be opened and folded down for use as a cargo floor while the window 38 remains within the panel protected from damage.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A midgate for use between adjacent compartments of a vehicle, the midgate comprising:

a hinged midgate panel closable for separating and openable for connecting the compartments;

a pass through opening in the midgate panel for allowing access between the compartments when the midgate panel is closed, and a pass through closure hinged to the midgate panel for closing, or allowing access trough the pass through opening;

a window lowerable into the panel for access through a window opening and raisable for closing the opening while allowing viewing therethrough;

a window actuator for moving the window between open and closed positions;

an interlock system operative to prevent opening of the hinged panel when the window is in the closed position and to prevent raising of the window when the panel is open.

2. A midgate as in claim 1, wherein the window at least partially closes the pass through opening when lowered for access through the window opening, the midgate panel including a window interlock preventing opening of the pass through closure when the window is at least partially open.

3. A midgate as in claim 2, wherein the midgate panel includes a pass through closure interlock preventing opening movement of the window in the panel when the pass through closure is open.

4. A midgate as in claim 3, wherein the pass through closure includes separately openable inner and outer closure panels and the pass through interlock system includes separate inner and outer interlock elements preventing opening movement of the window in the midgate panel when either of the inner and outer closure panels is not fully closed.

5. A midgate as in claim 1 wherein the interlock system is operative to prevent opening of the midgate panel unless the window is in a fully open position.

6. A midgate as in claim 5 where, in its fully open position, the window is fully retracted into the midgate panel to prevent damage to the window.

7. A midgate as in claim 6 with a multi-use vehicle wherein the adjacent compartments are a cargo bed and an interior compartment, the midgate panel when closed separating the cargo bed from the interior compartment and when open, allowing access between them.

8. A midgate as in claim 7 wherein the midgate panel is hinged at the bottom and folds down into the interior compartment to act when open as an extension of the cargo bed, retraction of the window into the panel preventing damage to the window through contact with cargo or otherwise during opening of the panel or during use of the panel as a cargo bed.

9. A midgate as in claim 8 wherein the interior compartment includes seats for carrying passengers, the seats being foldable for carrying of cargo in the interior compartment and for allowing opening of the midgate panel to provide an extension of the cargo bed.

10. A midgate for use between adjacent compartments of a vehicle body, the midgate comprising:

a hinged midgate panel closable for separating and openable for connecting the compartments;

a panel latch to releaseably latch the midgate panel to the vehicle body;

a latch release motor associated with the panel latch operable to release the latch;

a user-actuated push button latch release switch located on the panel;

a window lowerable into the panel for access through a window opening and raisable for closing the opening while allowing viewing therethrough;

a window actuator for moving the window between full up and full down positions;

a window down limit switch to indicate when the window is in the full down position; and an interlock system operative to prevent opening of the hinged panel unless the window is in the full down position and thus fully retracted into the midgate panel and to prevent raising of the window when the panel is open, wherein the interlock system comprises a midgate latch release circuit connecting the window down limit switch and the push button latch release switch with the latch release motor.

11. A midgate as in claim 10 wherein the adjacent compartments are a cargo bed and an interior compartment, the midgate panel when closed separating the cargo bed from the interior compartment and when open allowing access between them.

12. A midgate as in claim 11 wherein the midgate panel is hinged at the bottom and folds down into the interior compartment to act when open as an extension of the cargo bed, retraction of the window into the panel preventing damage to the window through contact with cargo or otherwise during opening of the panel or during use of the panel as a cargo bed.

13. A midgate as in claim 12 wherein the interior compartment includes seats for carrying passengers, the seats being foldable for carrying of cargo in the interior compartment and for allowing opening of the midgate panel to provide an extension of the cargo bed.

* * * * *